United States Patent
Xiong et al.

(10) Patent No.: US 10,999,818 B2
(45) Date of Patent: *May 4, 2021

(54) PAGING METHOD, DEVICE, AND PAGING SYSTEM

(71) Applicant: Huawei Technologies Co., Ltd., Shenzhen (CN)

(72) Inventors: Xin Xiong, Beijing (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,879

(22) Filed: Apr. 9, 2020

(65) Prior Publication Data

US 2020/0305119 A1 Sep. 24, 2020

Related U.S. Application Data

(63) Continuation of application No. 15/656,692, filed on Jul. 21, 2017, which is a continuation of application No. PCT/CN2015/071463, filed on Jan. 23, 2015.

(51) Int. Cl.
| | | |
|---|---|---|
| *H04W 68/02* | (2009.01) | |
| *H04W 4/70* | (2018.01) | |
| *H04W 52/02* | (2009.01) | |
| *H04W 68/00* | (2009.01) | |

(52) U.S. Cl.
CPC ............ *H04W 68/02* (2013.01); *H04W 4/70* (2018.02); *H04W 52/0245* (2013.01); *H04W 68/00* (2013.01); *Y02D 30/70* (2020.08)

(58) Field of Classification Search
CPC ... H04W 68/02; H04W 4/70; H04W 52/0245; H04W 68/00; H04W 68/06; H04W 68/08; Y02D 30/70
See application file for complete search history.

(56) References Cited

U.S. PATENT DOCUMENTS

2012/0157132 A1 6/2012 Olsson et al.
2013/0003577 A1 1/2013 Gupta et al.
(Continued)

FOREIGN PATENT DOCUMENTS

CN 101132639 A 2/2008
CN 101668281 A 3/2010
(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 12)," 3GPP TS 36.304 V12.3.0, pp. 1-37, 3rd Generation Partnership Project, Valbonne, France (Dec. 2014).

(Continued)

*Primary Examiner* — Wayne H Cai

(74) *Attorney, Agent, or Firm* — Leydig, Voit & Mayer, Ltd.

(57) ABSTRACT

The present invention discloses a paging method, a device, and a paging system, and relates to the field of wireless communications technologies. The method provided in the present invention includes: receiving, by a base station, a paging message of machine-to-machine user equipment; calculating a paging location of the user equipment; determining a coverage level of the user equipment; and sending an air interface paging message to the user equipment according to the coverage level of the user equipment, and sending, in the paging location, paging scheduling information, where the paging scheduling information is used to indicate a location in which the air interface paging message is sent, and the air interface paging message includes the paging message of the user equipment.

13 Claims, 7 Drawing Sheets

(56) References Cited

U.S. PATENT DOCUMENTS

| | | |
|---|---|---|
| 2014/0098761 A1 | 4/2014 | Lee et al. |
| 2014/0192720 A1 | 7/2014 | Lee et al. |
| 2014/0254490 A1 | 9/2014 | Jain et al. |
| 2015/0365914 A1 | 12/2015 | Yu et al. |
| 2016/0029434 A1 | 1/2016 | Qiu et al. |
| 2016/0157253 A1 | 6/2016 | Yamine et al. |

FOREIGN PATENT DOCUMENTS

| | | |
|---|---|---|
| CN | 102118816 A | 7/2011 |
| CN | 102143584 A | 8/2011 |
| CN | 103782652 A | 5/2014 |
| CN | 103929779 A | 7/2014 |
| CN | 104137635 A | 11/2014 |
| CN | 104202828 A | 12/2014 |
| CN | 104244412 A | 12/2014 |
| EP | 2503833 A1 | 9/2012 |
| EP | 2945454 A1 | 11/2015 |
| EP | 2953409 A1 | 12/2015 |
| GB | 2509910 A | 7/2014 |
| JP | 2013504234 A | 2/2013 |
| JP | 2016512002 A | 4/2016 |
| JP | 2016524839 A | 8/2016 |
| WO | 2010148749 A1 | 12/2010 |
| WO | 2014107994 A1 | 7/2014 |
| WO | 2014131167 A1 | 9/2014 |
| WO | 2014179985 A1 | 11/2014 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V124.0, pp. 1-251, 3rd Generation Partnership Project, Valbonne, France (Dec. 2014).

"3rd Generation Partnership Project; Technical Specification Group Radio Access Network; Evolved Universal Terrestrial Radio Access Network (E-UTRAN); S1 Application Protocol (S1AP) (Release 12)," 3GPP TS 36.413 V12A.0, 3rd Generation Partnership Project, Valbonne, France (Dec. 2014).

"Downlink bandwidth analysis for low cost MTC UE," 3GPP TSG-RAN WG2 Meeting #85bis, Valencia, Spain, R2-141104, total 4 pages (Mar. 31-Apr. 4, 2014).

"3rd Generation Partnership Project;Technical Specification Group Services and System Aspects; General Packet Radio Service (GPRS) enhancements for Evolved Universal Terrestrial Radio Access Network (E-UTRAN) access Release 13)," 3GPP TS 23.401 V13.1.0, pp. 1-310, 3rd Generation Partnership Project, Valbonne, France (Dec. 2014).

"3rd Generation Partnership Project; Technical Specification Group Radio Access Network; Evolved Universal Terrestrial Radio Access (E-UTRA); Multiplexing and channel coding (Release 12)," 3GPP TS 36.212 V12.3.0, pp. 1-89, 3rd Generation Partnership Project, Valbonne, France (Dec. 2014).

"3rd Generation Partnership Project; Technical Specification Group Radio Access Network; Evolved Universal Terrestrial Radio Access (E-UTRA); Physical layer procedures (Release 12)," 3GPP TS 36.213 V12.4.0, pp. 1-225, 3rd Generation Partnership Project, Valbonne, France (Dec. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.4.1, pp. 1-410, 3rd Generation Partnership Project, Valbonne, France (Dec. 2014).

PAGING METHOD, DEVICE, AND PAGING SYSTEM

CROSS-REFERENCE TO RELATED APPLICATIONS

This application is a continuation of U.S. patent application Ser. No. 15/656,692, filed on Jul. 21, 2017, which is a continuation of International Application No. PCT/CN2015/071463, filed on Jan. 23, 2015. All of the afore-mentioned patent applications are hereby incorporated by reference in their entireties.

TECHNICAL FIELD

The present invention relates to the field of wireless communications technologies, and in particular, to a paging method, a device, and a paging system.

BACKGROUND

Machine-to-machine (M2M) communication is a type of data communication of one or more machinery devices that do not need to interact with a person, where a machinery device (such as a sensor, an electricity meter, a water meter, or an alarm device) used in the M2M communication may be referred to as user equipment. Because in an M2M communications system, a quantity of user equipment is extremely large and the user equipment is mostly powered by a battery, for the M2M system, replacing a battery each time is an extremely heavy workload. In view of this, relatively low power consumption and a relatively long standby time of the user equipment are expected by people. To meet this feature of the user equipment, in an idle mode of the M2M communications system, a base station periodically sends a paging message to the user equipment, so that the user equipment is woken up only at a specific interval according to the paging message sent by the base station, to send and receive data, and is in a dormant state in another time period, that is, a communication interface of the user equipment is shut down, so as to reduce battery power of the user equipment.

FIG. 1 shows a frame format of a paging message scheduling cycle in an existing M2M communications system. As shown in FIG. 1, one paging cycle (PC) includes several paging frames, and each paging frame includes several paging occasions (PO). The PF is a radio frame, and the PO is a radio subframe. Paging scheduling information is sent to user equipment at a PO moment, where the paging scheduling information is downlink control information (DCI), which is used to indicate a location in which a paging message is located. After the paging scheduling message is received by the user equipment at the PO moment, a location of the paging message is parsed, the paging message is obtained, and the user equipment is successfully woken up.

However, in an actual application, when a base station sends a paging message to user equipment, only a transmission mechanism of an existing cellular system is used, and a coverage intensity of a location in which the user equipment is located is not taken into consideration. In this case, if the user equipment is deployed in an area with a poor coverage such as a corner or a basement, the paging message cannot be received by the user equipment.

SUMMARY

Embodiments of the present invention provide a paging method, a device, and a paging system, so as to resolve an existing problem that user equipment fails to receive a paging message when a coverage intensity of a location in which the user equipment is located is extremely weak.

To achieve the foregoing objective, the following technical solutions are used in the embodiments of the present invention:

According to a first aspect, an embodiment of the present invention provides a paging method, where the method includes:

receiving, by a base station, a paging message of user equipment, where the paging message includes a user identity of the user equipment;

calculating a paging location of the user equipment according to the user identity of the user equipment, and determining a coverage level of the user equipment; and sending an air interface paging message to the user equipment according to the coverage level of the user equipment, and sending, in the paging location, paging scheduling information, where the paging scheduling information is used to indicate a location in which the air interface paging message is sent, and the air interface paging message includes the paging message of the user equipment.

In a first possible implementation manner of the first aspect, with reference to the first aspect, the determining a coverage level of the user equipment includes:

if the paging message does not carry the coverage level of the user equipment, and the base station does not store a correspondence between the user equipment and the coverage level, determining that the coverage level of the user equipment is a worst coverage level.

In a second possible implementation manner of the first aspect, with reference to the first aspect or the first possible implementation manner of the first aspect, the sending an air interface paging message to the user equipment according to the coverage level of the user equipment includes:

combining paging messages with a paging location and a coverage level that are the same as those of the user equipment into a same paging record list;

making the paging record list included in an air interface paging message that is corresponding to the user equipment; and using, according to a preset correspondence between a coverage level and a modulation and coding scheme MCS, an MCS that is corresponding to the coverage level of the user equipment to perform modulation and coding on the air interface paging message, and sending the modulated and coded air interface paging message to the user equipment.

In a third possible implementation manner of the first aspect, with reference to any one of the first aspect to the second possible implementation manner of the first aspect, the receiving, by a base station, a paging message of user equipment includes:

receiving, by the base station, a paging message of the user equipment sent by a mobility management entity MME or a serving general packet radio service support node SGSN.

In a fourth possible implementation manner of the first aspect, with reference to the third possible implementation manner of the first aspect, the calculating a paging location of the user equipment includes:

calculating, according to a paging cycle of a network configuration, a paging super frame density, and an equipment identity of the user equipment, a paging super frame in which the paging location is located; and calculating, according to a quantity of paging occasions within one paging super frame, the equipment identity of the user equipment, and the paging super frame density, a paging occasion on which the paging location is located, where the quantity of the paging occasions within the paging super frame is determined according to a length of the paging super frame and a downlink control information interval.

In a fifth possible implementation manner of the first aspect, with reference to any one of the first aspect to the fourth possible implementation manner of the first aspect, the method further includes:

re-determining a coverage level of the user equipment if the base station receives retransmission indication information that is used to instruct to re-send a paging message of the user equipment; and sending an air interface paging message to the user equipment according to the re-determined coverage level of the user equipment.

In a sixth possible implementation manner of the first aspect, with reference to the fifth possible implementation manner of the first aspect, the re-determining a coverage level of the user equipment includes:

if the retransmission indication message received by the base station includes a current coverage level of the user equipment, determining that the coverage level of the user equipment is the current coverage level; or if the retransmission indication message received by the base station does not include a current coverage level of the user equipment, lowering the coverage level of the user equipment to a next inferior coverage level, or determining that the coverage level of the user equipment is the worst coverage level.

According to a second aspect, an embodiment of the present invention provides a paging method, including:

receiving, by user equipment and in a paging location, paging scheduling information sent by a base station, where the paging scheduling message is coded according to a modulation and coding scheme MCS that is corresponding to a coverage level of the user equipment, and is used to indicate a location of an air interface paging message sent by the base station to the user equipment, where the coverage level of the user equipment is reported to an MME or an SGSN by the user equipment, and delivered to the base station by the MME or the SGSN; and decoding, by the user equipment, the paging scheduling information according to an MCS that is corresponding to a current coverage level of the user equipment.

In a first possible implementation manner of the second aspect, with reference to the second aspect, the method further includes:

if the user equipment successfully parses the paging scheduling information, receiving, according to the location indicated by the paging scheduling information, the air interface paging message sent by the base station, and obtaining a paging message of the user equipment from the air interface paging message; or if the user equipment fails to parse the paging scheduling information, reporting the current coverage level of the user equipment to the MME or the SGSN by using the base station.

In a second possible implementation manner of the second aspect, with reference to the first possible implementation manner of the second aspect, the reporting the current coverage level of the user equipment to the MME or the SGSN by using the base station includes:

reporting, by the user equipment, a random access message that carries the current coverage level of the user equipment to the base station, and instructing the base station to report the current coverage level of the user equipment to the MME or the SGSN; or reporting, by the user equipment, a registration Attach message, or a tracking area update TAU message, or a routing area update RAU message that carries the current coverage of the user equipment to the base station, and instructing the base station to forward the Attach message, or the TAU message, or the RAU message to the MME or the SGSN.

According to a third aspect, an embodiment of the present invention provides a base station, including:

a receiving unit, configured to receive a paging message of user equipment, where the paging message includes a user identity of the user equipment;

a calculating unit, configured to calculate a paging location of the user equipment according to the user identity received by the receiving unit;

a determining unit, configured to determine a coverage level of the user equipment according to the user identity received by the receiving unit; and a sending unit, configured to send an air interface paging message to the user equipment according to the coverage level of the user equipment determined by the determining unit, and send, in the paging location calculated by the calculating unit, paging scheduling information, where the paging scheduling information is used to indicate a location in which the air interface paging message is sent, and the air interface paging message includes the paging message of the user equipment.

In a first possible implementation manner of the third aspect, with reference to the third aspect, the determining unit is specifically configured to:

if the paging message does not carry the coverage level of the user equipment, and the base station does not store a correspondence between the user equipment and the coverage level, determine that the coverage level of the user equipment is a worst coverage level.

In a second possible implementation manner of the third aspect, with reference to the third aspect or the first possible implementation manner of the third aspect, the sending unit is specifically configured to:

combine paging messages with a paging location and a coverage level that are the same as those of the user equipment into a same paging record list;

make the paging record list included in an air interface paging message that is corresponding to the user equipment; and use, according to a preset correspondence between a coverage level and a modulation and coding scheme MCS, an MCS that is corresponding to the coverage level of the user equipment to perform modulation and coding on the air interface paging message, and send the modulated and coded air interface paging message to the user equipment.

In a third possible implementation manner of the third aspect, with reference to any one of the third aspect to the second possible implementation manner of the third aspect, the receiving unit is specifically configured to:

receive a paging message of the user equipment sent by an MME or an SGSN.

In a fourth possible implementation manner of the third aspect, with reference to the third possible implementation manner of the third aspect, the calculating unit is specifically configured to:

calculate, according to a paging cycle of a network configuration, a paging super frame density, and an equipment identity of the user equipment, a paging super frame in which the paging location is located; and calculate, according to a quantity of paging occasions within one paging super frame, the equipment identity of the user equipment, and the paging super frame density, a paging occasion on which the paging location is located, where the quantity of the paging occasions within the paging super frame is determined according to a length of the paging super frame and a downlink control information interval.

In a fifth possible implementation manner of the third aspect, with reference to any one of the third aspect to the fourth possible implementation manner of the third aspect, the determining unit is further configured to re-determine a coverage level of the user equipment if the receiving unit receives retransmission indication information that is used to instruct to re-send a paging message of the user equipment; and the sending unit is further configured to send an air interface paging message to the user equipment according to the coverage level of the user equipment re-determined by the determining unit.

In a sixth possible implementation manner of the third aspect, with reference to the fifth possible implementation manner of the third aspect, the determining unit is specifically configured to:

if the retransmission indication message received by the base station includes a current coverage level of the user equipment, determine that the coverage level of the user equipment is the current coverage level; or if the retransmission indication message received by the base station does not include a current coverage level of the user equipment, lower the coverage level of the user equipment to a next inferior coverage level, or determine that the coverage level of the user equipment is the worst coverage level.

According to a fourth aspect, an embodiment of the present invention provides user equipment, including:

a receiving unit, configured to receive, in a paging location, paging scheduling information sent by a base station, where the paging scheduling message is coded according to a modulation and coding scheme MCS that is corresponding to a coverage level of the user equipment, and is used to indicate a location of an air interface paging message sent by the base station to the user equipment, where the coverage level of the user equipment is reported to an MME or an SGSN by the user equipment, and delivered to the base station by the MME or the SGSN; and a parsing unit, configured to decode the paging scheduling information according to an MCS that is corresponding to a current coverage level of the user equipment.

In a first possible implementation manner of the fourth aspect, with reference to the fourth aspect, if the user equipment successfully parses the paging scheduling information, the user equipment further includes:

an obtaining unit, configured to: if the parsing unit successfully parses the paging scheduling information, receive, according to the location indicated by the paging scheduling information that is received by the receiving unit, the air interface paging message sent by the base station, and obtain a paging message of the user equipment from the air interface paging message; and a reporting unit, configured to: if the parsing unit fails to parse the paging scheduling information, report the current coverage level of the user equipment to the base station.

In a second possible implementation manner of the fourth aspect, with reference to the first possible implementation manner of the fourth aspect, the reporting unit is specifically configured to:

report a random access message that carries the current coverage level of the user equipment to the base station, and instruct the base station to report the current coverage level of the user equipment to the MME or the SGSN; or report a registration Attach message, or a tracking area update TAU message, or a routing area update RAU message that carries the current coverage of the user equipment to the base station, and instruct the base station to forward the Attach message, or the TAU message, or the RAU message to the MME or the SGSN.

According to a fifth aspect, an embodiment of the present invention provides a paging system, including: the base station according to any one of the third aspect to the sixth possible implementation manner of the third aspect, the user equipment according to any one of the fourth aspect to the second possible implementation manner of the fourth aspect, and a core network device, where the core network device is an MME or an SGSN.

According to a sixth aspect, an embodiment of the present invention provides a base station, including:

a communications unit, configured to receive a paging message of machine-to-machine user equipment, where the paging message includes a user identity of the user equipment; and a processor, configured to calculate a paging location of the user equipment and determine a coverage level of the user equipment, according to the user identity received by the communications unit, where the communications unit is further configured to send an air interface paging message to the user equipment according to the coverage level of the user equipment determined by the processor, and send, in the paging location calculated by the processor, paging scheduling information, where the paging scheduling information is used to indicate a location in which the air interface paging message is sent, and the air interface paging message includes the paging message of the user equipment.

In a first possible implementation manner of the sixth aspect, with reference to the sixth aspect, the processor is specifically configured to:

if the paging message does not carry the coverage level of the user equipment, and the base station does not store a correspondence between the user equipment and the coverage level, determine that the coverage level of the user equipment is a worst coverage level.

In a second possible implementation manner of the sixth aspect, with reference to the sixth aspect or the first possible implementation manner of the sixth aspect, the communications unit is specifically configured to:

combine paging messages with a paging location and a coverage level that are the same as those of the user equipment into a same paging record list;

make the paging record list included in an air interface paging message that is corresponding to the user equipment; and use, according to a preset correspondence between a coverage level and a modulation and coding scheme MCS, an MCS that is corresponding to the coverage level of the user equipment to perform modulation and coding on the air interface paging message, and send the modulated and coded air interface paging message to the user equipment.

In a third possible implementation manner of the sixth aspect, with reference to any one of the sixth aspect to the second possible implementation manner of the sixth aspect, the communications unit is specifically configured to:

receive a paging message of the user equipment sent by an MME or an SGSN.

In a fourth possible implementation manner of the sixth aspect, with reference to the third possible implementation manner of the sixth aspect, the processor is specifically configured to:

calculate, according to a paging cycle of a network configuration, a paging super frame density, and an equipment identity of the user equipment, a paging super frame in which the paging location is located; and calculate, according to a quantity of paging occasions within one paging super frame, the equipment identity of the user equipment, and the paging super frame density, a paging occasion on which the paging location is located, where the quantity of the paging occasions within the paging super frame is determined according to a length of the paging super frame and a downlink control information interval.

In a fifth possible implementation manner of the sixth aspect, with reference to any one of the sixth aspect to the fourth possible implementation manner of the sixth aspect, the processor is further configured to re-determine a coverage level of the user equipment if the communications unit receives retransmission indication information that is used to instruct to re-send a paging message of the user equipment; and the communications unit is further configured to send an air interface paging message to the user equipment according to the coverage level of the user equipment re-determined by the processor.

In a sixth possible implementation manner of the sixth aspect, with reference to the fifth possible implementation manner of the sixth aspect, the processor is specifically configured to:

if the retransmission indication message received by the base station includes a current coverage level of the user equipment, determine that the coverage level of the user equipment is the current coverage level; or if the retransmission indication message received by the base station does not include a current coverage level of the user equipment, lower the coverage level of the user equipment to a next inferior coverage level, or determine that the coverage level of the user equipment is the worst coverage level.

According to a seventh aspect, an embodiment of the present invention provides user equipment, including:

a communications unit, configured to receive, in a paging location, paging scheduling information sent by a base station, where the paging scheduling message is coded according to a modulation and coding scheme MCS that is corresponding to a coverage level of the user equipment, and is used to indicate a location of an air interface paging message sent by the base station to the user equipment, where the coverage level of the user equipment is reported to an MME or an SGSN by the user equipment, and delivered to the base station by the MME or the SGSN; and a processor, configured to decode, according to an MCS that is corresponding to a current coverage level of the user equipment, the paging scheduling information received by the communications unit.

In a first possible implementation manner of the seventh aspect, with reference to the seventh aspect, the processor is further configured to: if the processor successfully parses the paging scheduling information, receive, according to the location indicated by the paging scheduling information, the air interface paging message sent by the base station, and obtain a paging message of the user equipment from the air interface paging message; and the communications unit is further configured to: if the processor fails to parse the paging scheduling information, report the current coverage level of the user equipment to the base station.

In a second possible implementation manner of the seventh aspect, with reference to the first possible implementation manner of the seventh aspect, the communications unit is specifically configured to:

report a random access message that carries the current coverage level of the user equipment to the base station, and instruct the base station to report the random access message to the MME or the SGSN, so that the MME or the SGSN sends, to the base station, retransmission indication information that is used to instruct to re-send a paging message of the user equipment.

According to an eighth aspect, an embodiment of the present invention provides a paging system, including: the base station according to any one of the sixth aspect to the sixth possible implementation manner of the sixth aspect, the user equipment according to any one of the seventh aspect to the second possible implementation manner of the seventh aspect, and a core network device, where the core network device is an MME or an SGSN.

It may be learned from the foregoing that the embodiments of the present invention provide a paging method, a device, and a paging system. When receiving a paging message of user equipment, a base station calculates a paging location of the user equipment and obtains a coverage level of the user equipment; and the base station sends an air interface paging message to the user equipment according to the coverage level of the user equipment, and sends, in the paging location, paging scheduling information, where the paging scheduling information is used to indicate a location in which the air interface paging message is sent, and the air interface paging message includes the paging message of the user equipment. Therefore, compared with the prior art, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 2:
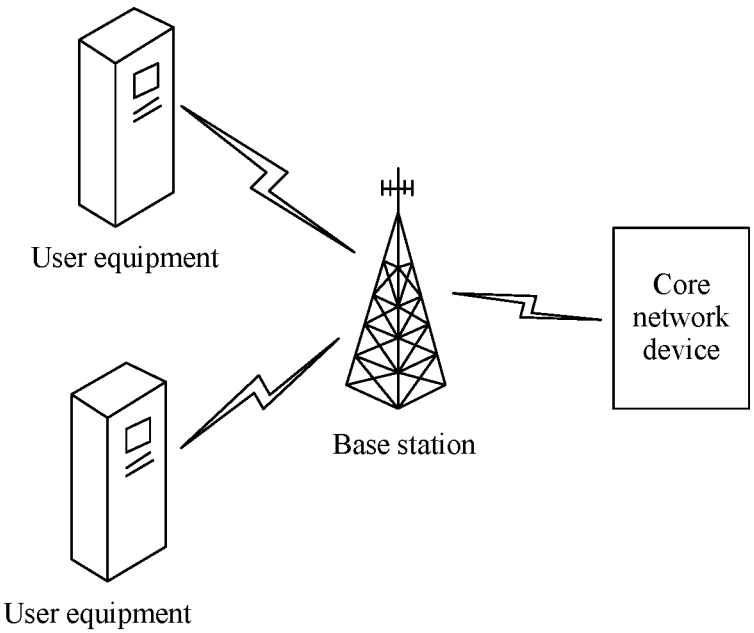
FIG. 2 is an application scenario of a paging method according to an embodiment of the present invention.

A paging method provided in embodiments of the present invention not only applies to a Long Term Evolution (LTE) network system, but also applies to any one of the following network systems: a Long Term Evolution-Advanced (LTE-A) system, the Universal Mobile Telecommunications System (UMTS), the Global System for Mobile Communication (GSM), and the like. However, the embodiments of the present invention impose no limitation on a specific communications system to which the paging method applies, and in the embodiments of the present invention, only a case in which the paging method applies to the LTE system is used as an example for description. FIG. 2 shows an application scenario of a paging method according to an embodiment of the present invention, where the scenario may include: multiple user equipments, a base station, a core network device. The user equipment may also be referred to as machine type communication (MTC for short), which may be any type of device without human interaction, and perform an information exchange by using the base station. The user equipment may be located in a location with a relatively high coverage level, for example, a strong coverage area in an existing cellular network, or may be located in a location with an extremely low coverage level, for example, a weak coverage area (a corner, a basement, or the like) in an existing cellular network. The core network device may be a mobility management entity (MME) that is connected to the base station by using an S1 interface, or may be a serving GPRS support node (SGSN) that is connected to the base station by using a Gb interface. For user equipment at a strong coverage level, a transmission gain of a paging message does not need to be increased, and the user equipment may properly receive the paging message. However, for user equipment at an extremely low coverage level, corresponding processing of increasing a transmission gain (such as increasing a transmission bit rate, changing a coding scheme, or spreading a spectrum) needs to be performed on a paging message, so that the user equipment can properly receive the paging message; that is, the paging message sent to the user equipment needs to be processed in different manners according to a coverage level of the user equipment, so that the user equipment can properly receive the paging message. In view of this, in the embodiments of the present invention, when the core network device needs to page user equipment, after a paging message is sent to the base station, the base station processes the paging message at a specific moment according to a current coverage level of the user equipment, and sends the processed paging message to the user equipment, so that the user equipment can properly receive the paging message. The following describes the paging method provided in the embodiments of the present invention.

Embodiment 1

Figure 3:
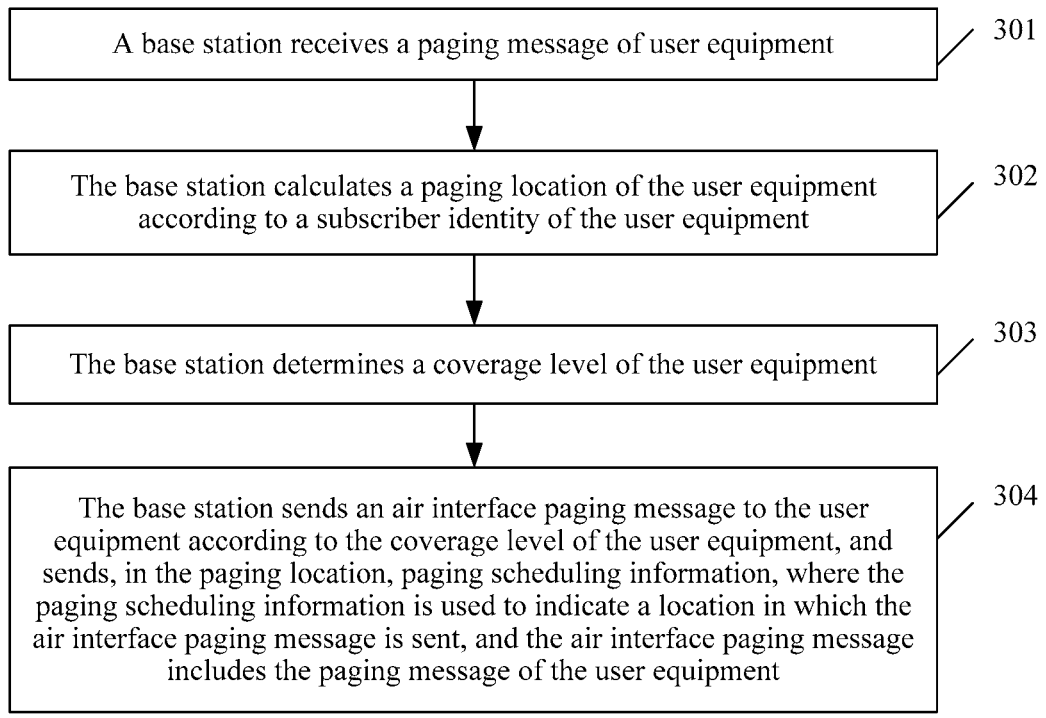
FIG. 3 is a flowchart of a paging method according to another embodiment of the present invention.

FIG. 3 shows a flowchart of a paging method according to Embodiment 1 of the present invention. As shown in FIG. 3, the method may include:

301. A base station receives a paging message of user equipment.

Preferably, the base station may receive, by using S1, a paging message of the user equipment sent by an MME; or receive, by using a Gb interface, a paging message of the user equipment sent by an SGSN.

The paging message includes a user identity of the user equipment, and is used to wake up user equipment that is in an idle state.

302. The base station calculates a paging location of the user equipment according to a user identity of the user equipment.

Figure 1:
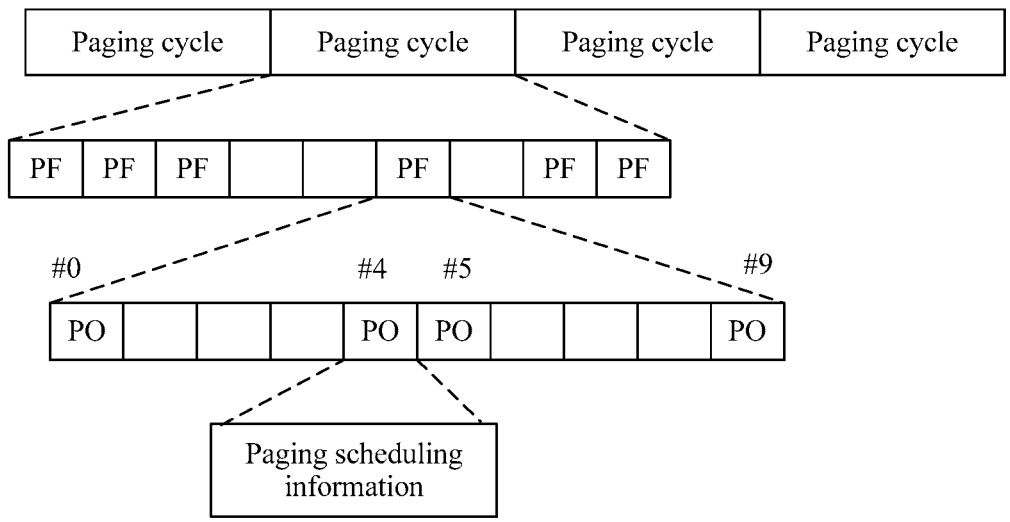
FIG. 1 is a frame format of a paging message scheduling cycle in an existing M2M communications system.
Figure 4:
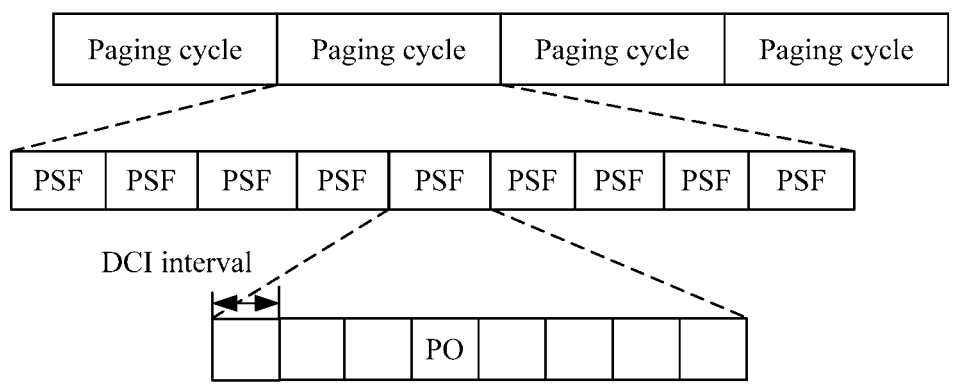
FIG. 4 is a frame format of a paging message scheduling cycle according to an embodiment of the present invention.

The paging location is used to send paging scheduling information, where the paging scheduling information is used to indicate a sending location in which the base station sends an air interface paging message to the user equipment. It should be noted that in this embodiment of the present invention, a frame format of a paging message scheduling cycle is different from that shown in FIG. 1. As shown in FIG. 4, in this embodiment of the present invention, each paging cycle includes several paging super frames (Paging Super Frame), and each paging super frame includes several paging occasions (Paging Occasion). The paging occasion is a radio frame and is equivalent to a paging frame shown in FIG. 1, and the paging occasion is a paging location and is used to bear downlink control information (DCI), for example, paging scheduling information. Each piece of downlink control information occupies one radio frame and is equivalent to occupying one paging occasion shown in FIG. 1.

Preferably, the base station may calculate, according to a paging cycle of a network configuration, a paging super frame density, and an equipment identity of the user equipment, a paging super frame in which the paging location is located; for example, determine, according to a formula: SFN mod T=(T div N)*(UE_ID mod N), the paging super frame in which the paging message is located; and calculate, according to a quantity of paging occasions within one paging super frame, the equipment identity of the user equipment, and the paging super frame density, a paging occasion on which the paging location is located; for example, determine, according to a formula: PO=floor (UE_ID/N) mod Ns, the paging occasion on which the paging message is located.

Symbols in the foregoing formulas: "mod" indicates dividing two integers to take a remainder; "div" indicates dividing two integers; "*" indicates multiplying two integers; "floor" indicates rounding down; and "/" indicates dividing two numbers.

Parameters in the foregoing formulas: UE_ID indicates the equipment identity of the user equipment that is used to identify the user equipment, and may be any one of the following identities: an international mobile subscriber identity (IMSI), a temporary mobile subscriber identity (TMSI), a globally unique temporary UE identity Globally Unique Temporary UE Identity, and an international mobile equipment identity (IMEI).

T indicates the paging cycle.

Ns indicates a quantity of paging occasions (PO) in one downlink control information interval (DCI interval), and a value is: Ns=ceil (the length of a super frame/the length of DCI interval), that is, the quantity of the paging occasions is equal to an integer value that is obtained by rounding up a quotient of a length of the paging super frame divided by the downlink control information interval. For example, in a current M2M communications system, the length of the super frame is 64 radio frames (radio frame). In this case, if the DCI interval is 64 radio frames, Ns is 1 at most; if the DCI interval is 32 radio frames, Ns is 2 at most; or if the DCI interval is one radio frame, Ns is 64 at most.

N indicates the paging super frame density in a paging cycle. For example, N=T/4 indicates that in one paging cycle T, every four super frames may have only one paging super frame; N=T/2 indicates that in one paging cycle T, every two super frames have only one paging super frame; and N=T indicates that in one paging cycle T, every super frame may be a paging super frame.

303. The base station determines a coverage level of the user equipment.

The coverage level is used to indicate a network coverage intensity of a location in which the user equipment is located, which may be divided into different levels according to a system regulation. Generally, three coverage levels are designed in a narrowband system, and are respectively: a level 0, a level 1, and a level 2. A higher coverage level indicates a lower network coverage intensity, and it is more necessary to use a modulation and coding scheme that can increase the network coverage intensity. The coverage level may be included in the paging message, or pre-stored in the base station.

In addition, if the coverage level is not included in the paging message, or is not pre-stored in the base station, the base station determines that the coverage level of the user equipment is a worst coverage level.

304. The base station sends an air interface paging message to the user equipment according to the coverage level of the user equipment, and sends, in the paging location, paging scheduling information, where the paging scheduling information is used to indicate a location in which the air interface paging message is sent, and the air interface paging message includes the paging message of the user equipment.

The air interface paging message is one or more M2M paging messages that are sent over a same air interface.

Preferably, the base station may combine paging messages with a paging location and a coverage level that are the same as those of the user equipment into a same paging record list;

make the paging record list included in an air interface paging message that is corresponding to the user equipment; and use, according to a preset correspondence between a coverage level and a modulation and coding scheme MCS, an MCS that is corresponding to the coverage level of the user equipment to perform modulation and coding on the air interface paging message, and send the modulated and coded air interface paging message to the user equipment.

The paging record list includes: a paging message and a correspondence between the paging message and the user equipment.

The correspondence between a coverage level and a modulation and coding scheme MCS is set in an M2M communication process according to a requirement, which is not limited in this embodiment of the present invention.

For example, if a paging super frame in a paging location of user equipment 1 is the first super frame, a paging occasion is the sixth radio frame, and a coverage level of the user equipment 1 is the level 1, if a paging super frame in a paging location of user equipment 2 is the first super frame, a paging occasion is the sixth radio frame, and a coverage level of the user equipment 2 is the level 1, and if a paging super frame in a paging location of user equipment 3 is the first super frame, a paging occasion is the sixth radio frame, and a coverage level of the user equipment 3 is the level 1, paging messages of the user equipment 1, the user equipment 2, and the user equipment 3 may be combined into a same paging record list, and the paging record list is transmitted by using an air interface.

TABLE 1

| Paging message | Equipment identity |
| --- | --- |
| Paging message 1 | User equipment 1 |
| Paging message 2 | User equipment 2 |
| Paging message 3 | User equipment 3 |

Obviously, in step 304, the base station may use a default modulation and coding scheme (for example, a modulation and coding scheme that is corresponding to the worst coverage level) to send the paging message; may use, according to a coverage level of the user equipment sent by the MME or the SGSN, a corresponding modulation and coding scheme to transmit the paging message; or may use, according to a coverage level of the user equipment stored in the inside of the base station, a corresponding modulation and coding scheme to transmit a paging message set. Therefore, it is implemented that a paging message is sent to user equipment according to a coverage level of the user equipment, so that user equipment at different coverage levels obtains, to some extent, a paging message that is corresponding to the user equipment, and returns a response message indicating that the paging is successful to the MME and the SGSN. However, because the user equipment may be moved to some extent, and a communication environment in which the user equipment is located is changing, a coverage level of the user equipment determined by the base station this time cannot accurately represent a current coverage level of the user equipment; if a paging message is sent after being modulated and coded according to an MCS that is corresponding to the coverage level, the user equipment cannot obtain the paging message because the user equipment fails to parse paging scheduling information, which further brings about paging message re-sending. Therefore, to reduce a quantity of times of re-sending a paging message of the user equipment, the method further includes:

re-determining a coverage level of the user equipment if the base station receives retransmission indication information that is used to instruct to re-send a paging message of the user equipment; and sending an air interface paging message to the user equipment according to the re-determined coverage level of the user equipment.

Exemplarily, the re-determining a coverage level of the user equipment may include:

if the retransmission indication message received by the base station includes a current coverage level of the user equipment, determining that the coverage level of the user equipment is the current coverage level; or if the retransmission indication message received by the base station does not include a current coverage level of the user equipment, lowering the coverage level of the user equipment to a next inferior coverage level, or determining that the coverage level of the user equipment is the worst coverage level.

It may be learned from the foregoing that this embodiment of the present invention provides a paging method. When receiving a paging message of user equipment, a base station calculates a paging location of the user equipment and determines a coverage level of the user equipment; and the base station sends an air interface paging message to the user equipment according to the coverage level of the user equipment, and sends, in the paging location, paging scheduling information, where the paging scheduling information is used to indicate a location in which the air interface paging message is sent, and the air interface paging message includes the paging message of the user equipment. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

Embodiment 2

Figure 5:
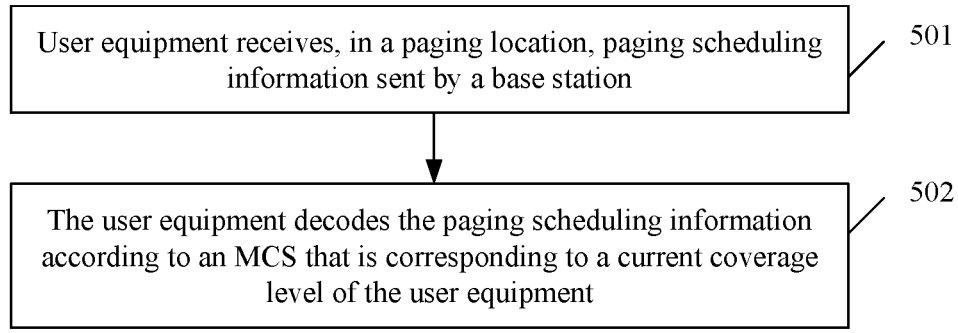
FIG. 5 is a flowchart of a paging method according to still another embodiment of the present invention.

FIG. 5 shows a flowchart of a paging method according to Embodiment 2 of the present invention. As shown in FIG. 5, the method may include:

501. User equipment receives, in a paging location, paging scheduling information sent by a base station.

The paging scheduling message is coded according to a modulation and coding scheme MCS that is corresponding to a coverage level of the user equipment, and is used to indicate a location of an air interface paging message sent by the base station to the user equipment, where the coverage level of the user equipment is reported to an MME or an SGSN by the user equipment, and delivered to the base station by the MME or the SGSN.

The air interface paging message includes a paging message record list, where the paging message record list includes a paging message of at least one user equipment and a correspondence between the paging message of the user equipment and the user equipment. In the paging message list, a paging location of a paging message and a coverage level that are of each user equipment are the same as the paging location and the coverage level that are of the user equipment.

It should be noted that a method for calculating a paging location by the user equipment is the same as a method for calculating a paging location by the base station, and details are not described herein.

502. The user equipment decodes the paging scheduling information according to an MCS that is corresponding to a current coverage level of the user equipment.

The user equipment may determine the current coverage level of the user equipment according to a reference signal received power (RSRP).

Further, if the user equipment successfully parses the paging scheduling information, it indicates that a coverage level used when the base station sends the paging scheduling information is the same as or lower than the current coverage level of the user equipment, and the method further includes:

receiving, by the user equipment according to the location indicated by the paging scheduling information, the air interface paging message sent by the base station, and obtaining a paging message of the user equipment from the air interface paging message.

If the user equipment fails to parse the paging scheduling information, it indicates that a coverage level used when the base station sends the paging scheduling information is higher than the current coverage level of the user equipment, and the user equipment needs to report the current coverage level of the user equipment to the MME or the SGSN.

Exemplarily, that the user equipment reports the current coverage level of the user equipment to the MME or the SGSN may include:

reporting, by the user equipment, a random access message that carries the current coverage level of the user equipment to the base station, and instructing the base station to report the current coverage level of the user equipment to the MME or the SGSN; or reporting, by the user equipment, a registration Attach message, or a tracking area update (TAU) message, or a routing area update (RAU) message that carries the current coverage of the user equipment to the base station, and instructing the base station to forward the Attach message, or the TAU message, or the RAU message to the MME or the SGSN.

It may be learned from the foregoing that this embodiment of the present invention provides a paging method. After user equipment receives paging scheduling information sent by a base station, if the user equipment successfully parses the paging scheduling information, the user equipment receives, according to a location indicated by the paging scheduling information, an air interface paging message sent by the base station, and obtains a paging message of the user equipment from the air interface paging message; or if the user equipment fails to parse the paging scheduling information, the user equipment reports a current coverage level of the user equipment to the base station, so that when re-sending a paging message to the user equipment, the base station re-sends the message to the user equipment according to the current coverage level of the user equipment. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

The following uses the application scenario shown in FIG. 2 as an example to describe a paging method provided in the present invention in detail by using Embodiment 3.

Embodiment 3

Figure 6A:
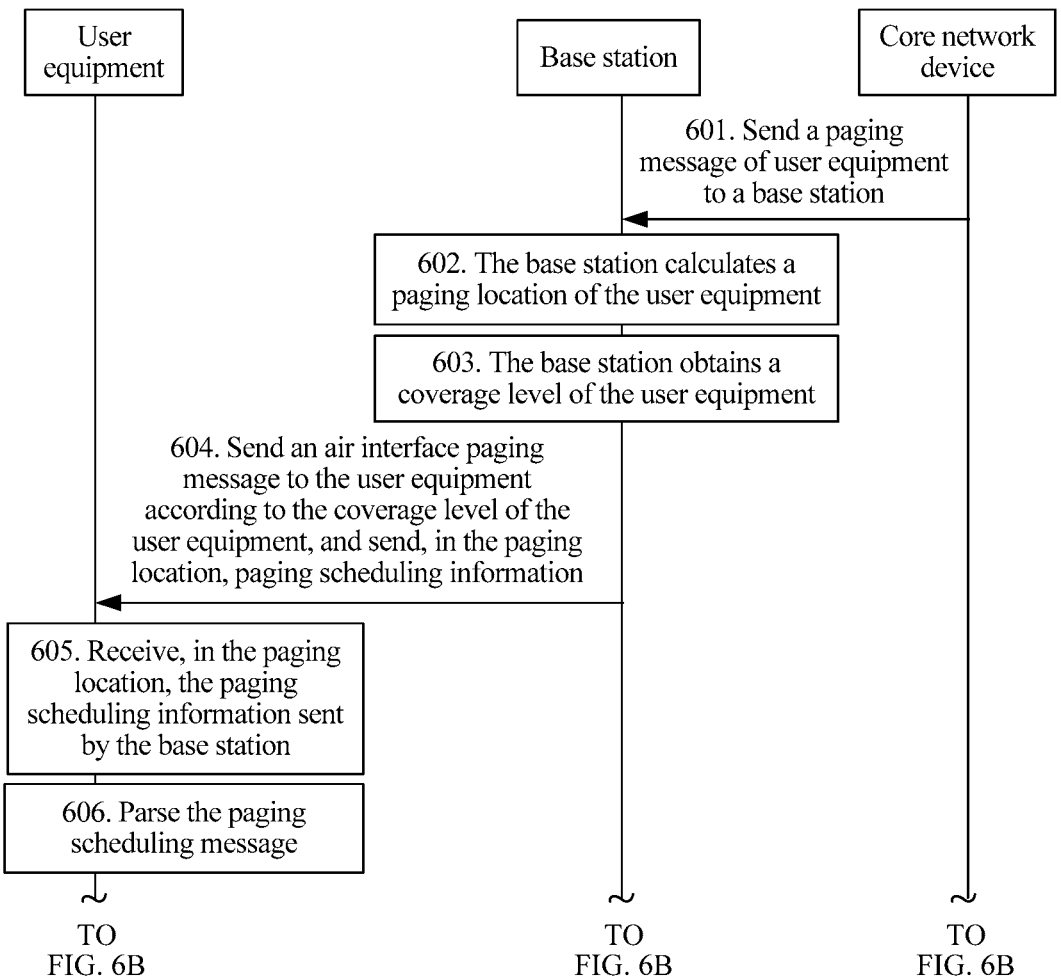
FIG. 6A and FIG. 6B are a flowchart of a paging method according to another embodiment of the present invention.
Figure 6B:
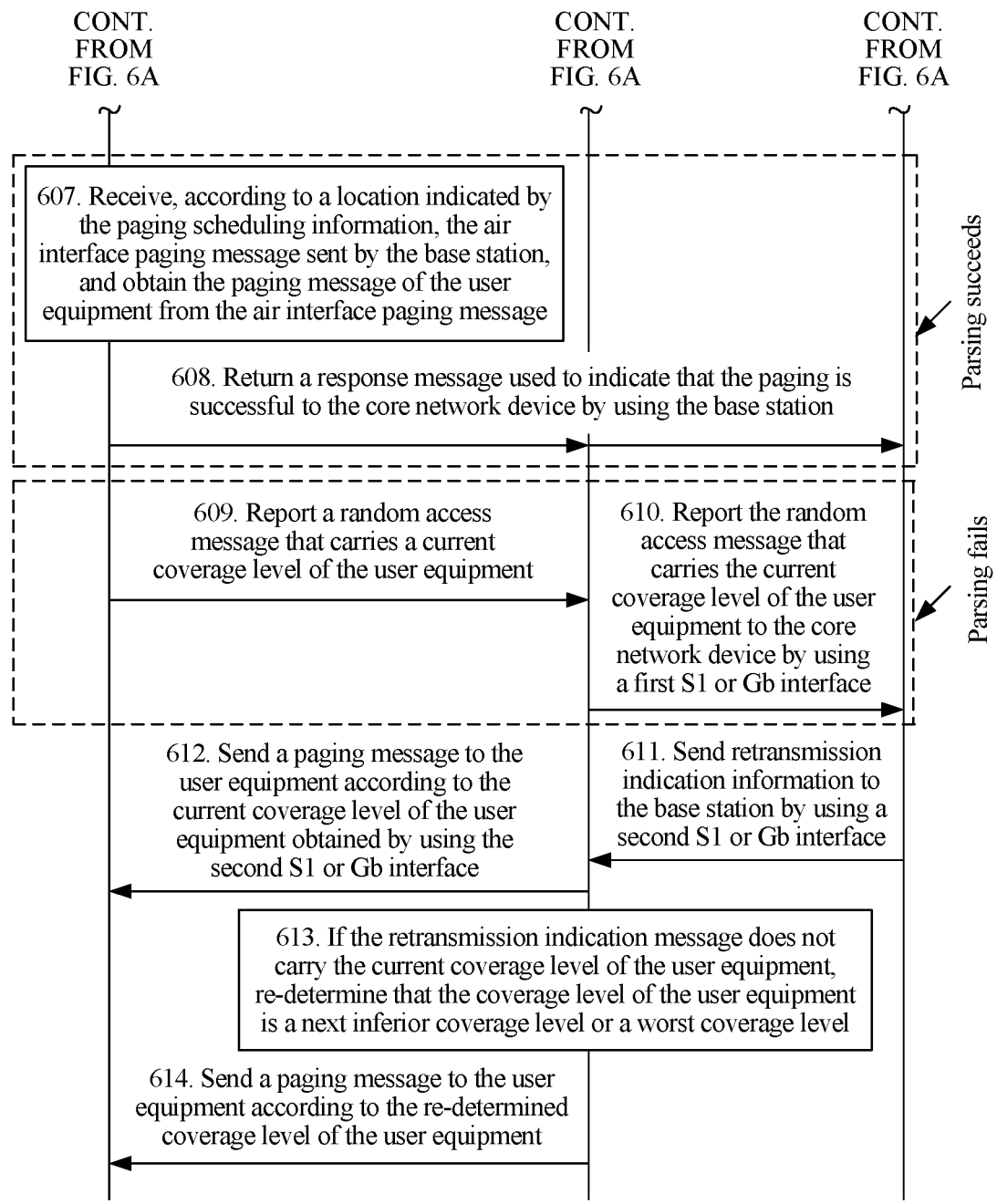

FIG. 6A and FIG. 6B are a flowchart of a paging method according to this embodiment of the present invention. As shown in FIG. 6A and FIG. 6B, the method may include:

601. A core network device sends a paging message of user equipment to a base station.

Preferably, the core network device sends the paging message of the user equipment to the base station by using an S1 interface or a Gb interface.

The paging message is used to wake up user equipment that is in an idle state.

602. The base station calculates a paging location of the user equipment.

The paging location is determined by a paging super frame and a paging occasion, and is used to send paging scheduling information, where the paging scheduling information is used to indicate a sending location in which the base station sends an air interface paging message to the user equipment.

Preferably, the base station may calculate the paging super frame according to a paging cycle of a network configuration, a paging super frame density, and an equipment identity of the user equipment; for example, determine, according to a formula: SFN mod T=(T div N)*(UE_ID mod N), the paging super frame in which the paging location is located; and calculate the paging occasion according to a quantity of paging occasions within one paging super frame, the equipment identity of the user equipment, and the paging super frame density; for example, determine, according to a formula: PO=floor(UE_ID/N) mod Ns, the paging occasion on which the paging location is located.

603. The base station determines a coverage level of the user equipment.

The coverage level is used to indicate a network coverage intensity of a location in which the user equipment is located, which may be divided into different levels according to a system regulation. Generally, three coverage levels are designed in a narrowband system, and are respectively: a level 0, a level 1, and a level 2. A higher coverage level indicates a lower network coverage intensity, and it is more necessary to use a modulation and coding scheme that can increase the network coverage intensity. The coverage level may be included in the paging message, or pre-stored in the base station.

In addition, if the coverage level is not included in the paging message, or is not pre-stored in the base station, the base station determines that the coverage level of the user equipment is a worst coverage level.

604. The base station sends an air interface paging message to the user equipment according to the coverage level of the user equipment, and sends, in the paging location, paging scheduling information.

The paging scheduling information is used to indicate a location in which the air interface paging message is sent, and the air interface paging message includes the paging message of the user equipment, where the air interface paging message is one or more paging messages of the user equipment that are sent over a same air interface.

Preferably, the base station may combine paging messages with a paging location and a coverage level that are the same as those of the user equipment into a same paging record list;

make the paging record list included in an air interface paging message that is corresponding to the user equipment; and use, according to a preset correspondence between a coverage level and a modulation and coding scheme MCS, an MCS that is corresponding to the coverage level of the user equipment to perform modulation and coding on the air interface paging message, and send the modulated and coded air interface paging message to the user equipment.

The paging record list includes: a paging message and a correspondence between the paging message and the user equipment.

605. The user equipment receives, in the paging location, the paging scheduling information sent by the base station.

It should be noted that a method for calculating a paging location by the user equipment is the same as a method for calculating a paging location by the base station.

606. The user equipment parses the paging scheduling message, and if the user equipment successfully parses the paging scheduling information, steps 607 and 608 are performed; or if the user equipment fails to parse the paging scheduling information, steps 609 and 610 are performed.

Preferably, the user equipment may parse the paging scheduling message by using a modulation and coding scheme that is corresponding to a coverage level determined by the user equipment. The user equipment may determine the coverage level of the user equipment according to a reference signal received power (English: Reference Signal Receiving Power, RSRP for short).

607. The user equipment receives, according to a location indicated by the paging scheduling information, the air interface paging message sent by the base station, and obtains the paging message of the user equipment from the air interface paging message.

608. The user equipment returns a response message used to indicate that the paging is successful to the core network device by using the base station.

609. The user equipment reports a random access message that carries a current coverage level of the user equipment to the base station.

610. The base station reports the random access message that carries the current coverage level of the user equipment to the core network device by using a first S1 or Gb interface.

611. When receiving no response message within a preset time, the core network device sends retransmission indication information to the base station by using a second S1 or Gb interface, where the retransmission indication information is indication information that is used to instruct to re-send a paging message of the user equipment; if the retransmission indication message includes the current coverage level of the user equipment, step 612 is performed; or if the retransmission indication message does not include the current coverage level of the user equipment, step 613 is performed.

612. The base station re-sends a paging message to the user equipment according to the coverage level of the user equipment obtained by using the second S1 or Gb interface.

613. The base station re-determines that the coverage level of the user equipment is a next inferior coverage level or a worst coverage level.

614. The base station sends a paging message to the user equipment according to the re-determined coverage level of the user equipment.

It may be learned from the foregoing that this embodiment of the present invention provides a paging method. After receiving a paging message of user equipment sent by a core network device, a base station calculates a paging location of the user equipment, sends an air interface paging message to the user equipment according to a determined coverage level of the user equipment, and sends, in the paging location, paging scheduling information; after receiving the paging scheduling information sent by the base station, the user equipment parses the paging scheduling message and obtains the paging message; if the parsing succeeds, the user equipment returns a response message; or if the parsing fails, the user equipment reports a current coverage level of the user equipment, so that the base station re-sends a paging message to the user equipment according to the current coverage level, or the user equipment does not report a current coverage level, so that the base station re-sends a paging message to the user equipment according to a re-determined coverage level. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

Embodiment 4

Figure 7:
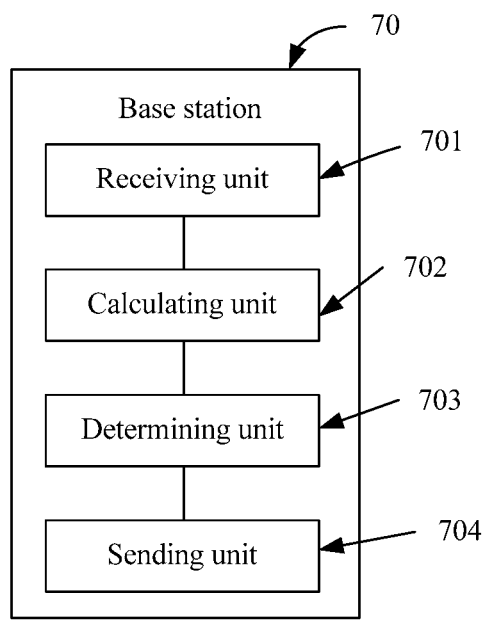
FIG. 7 is a structural diagram of a base station according to an embodiment of the present invention.

FIG. 7 shows a structural diagram of a base station 70, where the base station 70 executes the paging method described in Embodiment 1. As shown in FIG. 7, the base station 70 may include a receiving unit 701, a calculating unit 702, a determining unit 703, and a sending unit 704.

The receiving unit 701 is configured to receive a paging message of user equipment.

The paging message includes a user identity of the user equipment, and is used to wake up user equipment that is in an idle state.

The calculating unit 702 is configured to calculate a paging location of the user equipment according to the user identity received by the receiving unit 701.

The paging location is used to send paging scheduling information, where the paging scheduling information is used to indicate a sending location in which the base station sends an air interface paging message to the user equipment. It should be noted that in this embodiment of the present invention, a frame format of a paging message scheduling cycle is different from that shown in FIG. 1. As shown in FIG. 4, in this embodiment of the present invention, each paging cycle includes several paging super frames (Paging Super Frame), and each paging super frame includes several paging occasions (Paging Occasion). The paging occasion is a radio frame and is equivalent to a paging frame shown in FIG. 1, and the paging occasion is a paging location and is used to bear downlink control information (DCI), for example, paging scheduling information. Each piece of downlink control information occupies one radio frame and is equivalent to occupying one paging occasion shown in FIG. 1.

The determining unit 703 is configured to determine a coverage level of the user equipment according to the user identity received by the receiving unit 701.

The coverage level is used to indicate a network coverage intensity of a location in which the user equipment is located, which may be divided into different levels according to a system regulation. Generally, three coverage levels are designed in a narrowband system, and are respectively: a level 0, a level 1, and a level 2. A higher coverage level indicates a lower network coverage intensity, and it is more necessary to use a modulation and coding scheme that can increase the network coverage intensity. The coverage level may be included in the paging message, or pre-stored in the base station.

In addition, if the coverage level is not included in the paging message, or is not pre-stored in the base station, the determining unit 703 determines that the coverage level of the user equipment is a worst coverage level.

The sending unit 704 is configured to send an air interface paging message to the user equipment according to the coverage level of the user equipment determined by the determining unit 703, and send, in the paging location calculated by the calculating unit 702, paging scheduling information, where the paging scheduling information is used to indicate a location in which the air interface paging message is sent, and the air interface paging message includes the paging message of the user equipment.

The air interface paging message is one or more M2M paging messages that are sent over a same air interface.

Further, the receiving unit 701 is specifically configured to:

receive, by using S1, a paging message of the user equipment sent by an MME; or receive, by using a Gb interface, a paging message of the user equipment sent by an SGSN.

Further, the calculating unit 702 is specifically configured to:

calculate the paging super frame according to a paging cycle of a network configuration, a paging super frame density, and an equipment identity of the user equipment; for example, determine, according to a formula: SFN mod T=(T div N)*(UE_ID mod N), the paging super frame in which the paging location is located; and calculate the paging occasion according to a quantity of paging occasions within one paging super frame, the equipment identity of the user equipment, and the paging super frame density; for example, determine, according to a formula: PO=floor(UE_ID/N) mod Ns, the paging occasion on which the paging location is located.

Symbols in the foregoing formulas: "mod" indicates dividing two integers to take a remainder; "div" indicates dividing two integers; "*" indicates multiplying two integers; "floor" indicates rounding down; and "/" indicates dividing two numbers.

Parameters in the foregoing formulas: UE_ID indicates the equipment identity of the user equipment that is used to identify the user equipment, and may be any one of the following identities: an international mobile user identity (IMSI), a temporary mobile user identity (TMSI), a globally unique temporary UE identity Globally Unique Temporary UE Identity, and an international mobile equipment identity (IMEI).

T indicates the paging cycle.

Ns indicates a quantity of paging occasions (PO) in one downlink control information interval (DCI interval), and a value is: Ns=ceil (the length of a super frame/the length of DCI interval), that is, the quantity of the paging occasions is equal to an integer value that is obtained by rounding up a quotient of a length of the paging super frame divided by the downlink control information interval. For example, in a current M2M communications system, the length of the super frame is 64 radio frames (radio frame). In this case, if the DCI interval is 64 radio frames, Ns is 1 at most; if the DCI interval is 32 radio frames, Ns is 2 at most; or if the DCI interval is one radio frame, Ns is 64 at most.

N indicates the paging super frame density in a paging cycle. For example, N=T/4 indicates that in one paging cycle T, every four super frames may have only one paging super frame; N=T/2 indicates that in one paging cycle T, every two super frames have only one paging super frame; and N=T indicates that in one paging cycle T, every super frame may be a paging super frame.

Further, the sending unit 704 is specifically configured to:

combine paging messages with a paging location and a coverage level that are the same as those of the user equipment into a same paging record list;

make the paging record list included in an air interface paging message that is corresponding to the user equipment; and use, according to a preset correspondence between a coverage level and a modulation and coding scheme MCS, an MCS that is corresponding to the coverage level of the user equipment to perform modulation and coding on the air interface paging message, and send the modulated and coded air interface paging message to the user equipment.

The paging record list includes: a paging message and a correspondence between the paging message and the user equipment.

The correspondence between a coverage level and a modulation and coding scheme MCS is set in an M2M communication process according to a requirement, which is not limited in this embodiment of the present invention.

For example, if a paging super frame in a paging location of user equipment 1 is the first super frame, a paging occasion is the sixth radio frame, and a coverage level of the user equipment 1 is the level 1, if a paging super frame in a paging location of user equipment 2 is the first super frame, a paging occasion is the sixth radio frame, and a coverage level of the user equipment 2 is the level 1, and if a paging super frame in a paging location of user equipment 3 is the first super frame, a paging occasion is the sixth radio frame, and a coverage level of the user equipment 3 is the level 1, paging messages of the user equipment 1, the user equipment 2, and the user equipment 3 may be combined into a same paging record list, and the paging record list is transmitted by using an air interface.

Obviously, the base station may use a default modulation and coding scheme (for example, a modulation and coding scheme that is corresponding to the worst coverage level) to send the paging message; may use, according to a coverage level of the user equipment sent by the MME or the SGSN, a corresponding modulation and coding scheme to transmit the paging message; or may use, according to a coverage level of the user equipment stored in the inside of the base station, a corresponding modulation and coding scheme to transmit a paging message set. Therefore, it is implemented that a paging message is sent to user equipment according to a coverage level of the user equipment, so that user equipment at different coverage levels determines, to some extent, a paging message that is corresponding to the user equipment, and returns a response message indicating that the paging is successful to the MME and the SGSN. However, because the user equipment may be moved to some extent, and a communication environment in which the user equipment is located is changing, a coverage level of the user equipment determined by the base station this time cannot accurately represent a current coverage level of the user equipment; if a paging message is sent after being modulated and coded according to an MCS that is corresponding to the coverage level, the user equipment cannot obtain the paging message because the user equipment fails to parse paging scheduling information, which further brings about paging message re-sending.

Therefore, to reduce a quantity of times of re-sending a paging message of the user equipment, the determining unit 703 is further configured to re-determine a coverage level of the user equipment if the receiving unit 701 receives retransmission indication information that is used to instruct to re-send a paging message of the user equipment.

The sending unit 704 is further configured to send an air interface paging message to the user equipment according to the coverage level of the user equipment re-determined by the determining unit 703.

Further, the determining unit 703 is specifically configured to:

if the retransmission indication message received by the receiving unit 701 includes a current coverage level of the user equipment, determine that the coverage level of the user equipment is the current coverage level; or if the retransmission indication message received by the receiving unit 701 does not include a current coverage level of the user equipment, lower the coverage level of the user equipment to a next inferior coverage level, or determine that the coverage level of the user equipment is the worst coverage level.

It may be learned from the foregoing that this embodiment of the present invention provides a base station. When receiving a paging message of user equipment, the base station calculates a paging location of the user equipment and determines a coverage level of the user equipment; and the base station sends an air interface paging message to the user equipment according to the coverage level of the user equipment, and sends, in the paging location, paging scheduling information, where the paging scheduling information is used to indicate a location in which the air interface paging message is sent, and the air interface paging message includes the paging message of the user equipment. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

Embodiment 5

Figure 8:
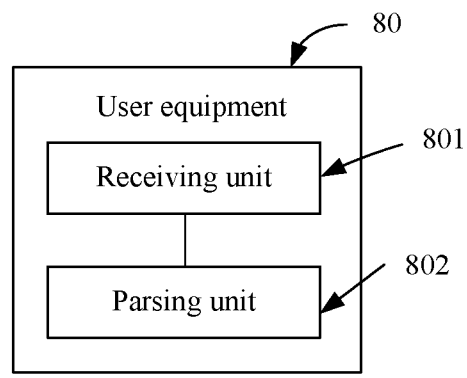
FIG. 8 is a structural diagram of user equipment according to an embodiment of the present invention.

FIG. 8 shows a structural diagram of user equipment 80, where the user equipment is configured to execute the paging method described in Embodiment 2. As shown in FIG. 8, the user equipment 80 may include a receiving unit 801 and a parsing unit 802.

The receiving unit 801 is configured to receive, in a paging location, paging scheduling information sent by a base station.

The paging scheduling message is coded according to a modulation and coding scheme MCS that is corresponding to a coverage level of the user equipment, and is used to indicate a location of an air interface paging message sent by the base station to the user equipment, where the coverage level of the user equipment is reported to an MME or an SGSN by the user equipment, and delivered to the base station by the MME or the SGSN.

The air interface paging message includes a paging message record list, where the paging message record list includes a paging message of at least one user equipment and a correspondence between the paging message of the user equipment and the user equipment. In the paging message list, a paging location of a paging message and a coverage level that are of each user equipment are the same as the paging location and the coverage level that are of the user equipment.

It should be noted that a method for calculating a paging location by the user equipment is the same as a method for calculating a paging location by the base station, and details are not described herein.

The parsing unit 802 is configured to decode, according to an MCS that is corresponding to a current coverage level of the user equipment, the paging scheduling information received by the receiving unit 801.

Figure 8A:
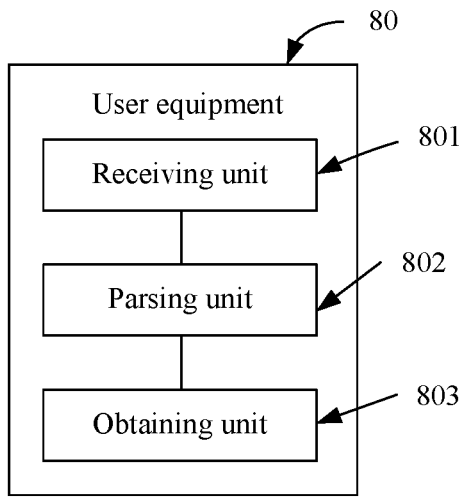
FIG. 8A is a structural diagram of user equipment according to an embodiment of the present invention.

Further, if the parsing unit 802 successfully parses the paging scheduling information, it indicates that a coverage level used when the base station sends the paging scheduling information is the same as or lower than the current coverage level of the user equipment. As shown in FIG. 8A, the user equipment further includes:

an obtaining unit 803, configured to receive, according to the location indicated by the paging scheduling information, the air interface paging message sent by the base station, and obtain a paging message of the user equipment from the air interface paging message.

Figure 8B:
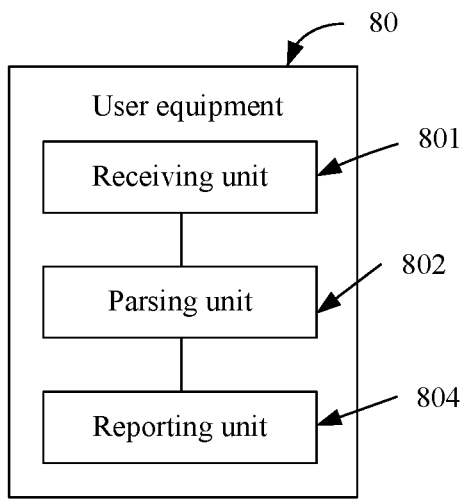
FIG. 8B is a structural diagram of user equipment according to an embodiment of the present invention.

Further, if the parsing unit 802 fails to parse the paging scheduling information, it indicates that a coverage level used when the base station sends the paging scheduling information is higher than the current coverage level of the user equipment. As shown in FIG. 8B, the user equipment further includes:

a reporting unit 804, configured to report the current coverage level of the user equipment to the MME or the SGSN.

Further, the reporting unit 804 is specifically configured to:

report a random access message that carries the current coverage level of the user equipment to the base station, and instruct the base station to report the current coverage level of the user equipment to the MME or the SGSN; or report a registration Attach message, or a tracking area update TAU message, or a routing area update RAU message that carries the current coverage of the user equipment to the base station, and instruct the base station to forward the Attach message, or the TAU message, or the RAU message to the MME or the SGSN.

It may be learned from the foregoing that this embodiment of the present invention provides user equipment. After the user equipment receives paging scheduling information sent by a base station, if the user equipment successfully parses the paging scheduling information, the user equipment receives, according to a location indicated by the paging scheduling information, an air interface paging message sent by the base station, and obtains a paging message of the user equipment from the air interface paging message; or if the user equipment fails to parse the paging scheduling information, the user equipment reports a current coverage level of the user equipment to the base station, so that when re-sending a paging message to the user equipment, the base station re-sends the message to the user equipment according to the current coverage level of the user equipment. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

Embodiment 6

Figure 9:
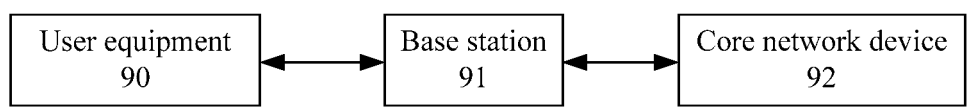
FIG. 9 is a structural diagram of a paging system according to an embodiment of the present invention.

FIG. 9 shows a structural diagram of a paging system, where the paging system is used to execute the paging method described in Embodiment 3. As shown in FIG. 9, the paging system may include: a base station 91, at least one user equipment 90, and a core network device 92.

A function of the base station 91 is the same as a function of the base station 70 in the foregoing Embodiment 4, and a function of the user equipment 90 is the same as a function of the user equipment 80 in the foregoing Embodiment 5. Details are not described herein.

The core network device 92 may be an MME or an SGSN, and is configured to send a paging message of an M2M91 to the base station 91, or send retransmission indication information that is used to instruct to re-send a paging message of the user equipment.

It may be learned from the foregoing that this embodiment of the present invention provides a paging system. After receiving a paging message of user equipment sent by a core network device, a base station calculates a paging location of the user equipment, sends an air interface paging message to the user equipment according to a determined coverage level of the user equipment, and sends, in the paging location, paging scheduling information; after receiving the paging scheduling information sent by the base station, the user equipment parses the paging scheduling message and obtains the paging message; if the parsing succeeds, the user equipment returns a response message; or if the parsing fails, the user equipment reports a current coverage level of the user equipment, so that the base station re-sends a paging message to the user equipment according to the current coverage level, or the user equipment does not report a current coverage level, so that the base station re-sends a paging message to the user equipment according to a re-determined coverage level. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

Embodiment 7

Figure 10:
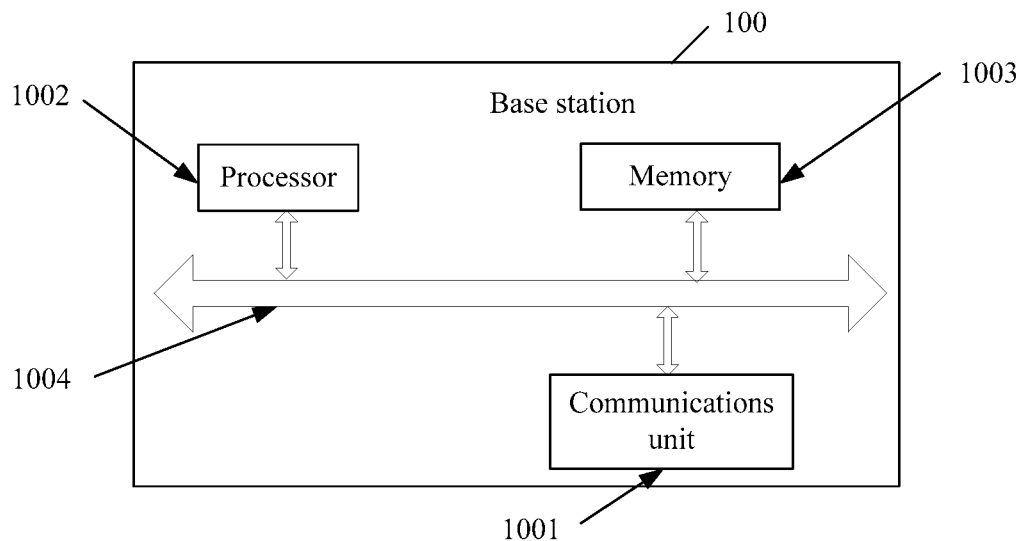
FIG. 10 is a structural diagram of a base station according to another embodiment of the present invention.

FIG. 10 shows a structural diagram of a base station, where the base station is configured to execute the paging method described in Embodiment 1. As shown in FIG. 10, the base station 100 may include: a communications unit 1001, a processor 1002, a memory 1003, and at least one communications bus 1004, where the communications bus 1004 is configured to implement connection and mutual communication between these devices.

The communications unit 1001 is configured to perform data transmission with an external network element.

The processor 1002 may be a central processing unit (English: central processing unit, CPU for short).

The memory 1003 may be a volatile memory, for example, a random access memory (RAM); may be a non-volatile memory, such as a read-only memory (ROM), a flash memory, a hard disk drive (HDD), or a solid-state drive (SSD); or may be a combination of the foregoing types of memories, and provides an instruction and data to the processor 1002.

The communications unit 1001 is configured to receive a paging message of user equipment.

The paging message includes a user identity of the user equipment, and is used to wake up user equipment that is in an idle state.

The processor 1002 is configured to calculate a paging location of the user equipment according to the user identity received by the communications unit 1001.

The paging location is used to send paging scheduling information, where the paging scheduling information is used to indicate a sending location in which the base station sends an air interface paging message to the user equipment. It should be noted that in this embodiment of the present invention, a frame format of a paging message scheduling cycle is different from that shown in FIG. 1. As shown in FIG. 4, in this embodiment of the present invention, each paging cycle includes several paging super frames (Paging Super Frame), and each paging super frame includes several paging occasions (Paging Occasion). The paging occasion is a radio frame and is equivalent to a paging frame shown in FIG. 1, and the paging occasion is a paging location and is used to bear downlink control information (DCI), for example, paging scheduling information. Each piece of downlink control information occupies one radio frame and is equivalent to occupying one paging occasion shown in FIG. 1.

The processor 1002 is further configured to determine a coverage level of the user equipment according to the user identity received by the communications unit 1001.

The coverage level is used to indicate a network coverage intensity of a location in which the user equipment is located, which may be divided into different levels according to a system regulation. Generally, three coverage levels are designed in a narrowband system, and are respectively: a level 0, a level 1, and a level 2. A higher coverage level indicates a lower network coverage intensity, and it is more necessary to use a modulation and coding scheme that can increase the network coverage intensity. The coverage level may be included in the paging message, or pre-stored in the base station.

In addition, if the coverage level is not included in the paging message, or is not pre-stored in the base station, the processor 1002 determines that the coverage level of the user equipment is a worst coverage level.

The communications unit 1001 is further configured to send an air interface paging message to the user equipment according to the coverage level of the user equipment determined by the processor 1002, and send, in the paging location calculated by the processor 1002, paging scheduling information, where the paging scheduling information is used to indicate a location in which the air interface paging message is sent, and the air interface paging message includes the paging message of the user equipment.

The air interface paging message is one or more M2M paging messages that are sent over a same air interface.

Further, the communications unit 1001 is specifically configured to:

receive, by using S1, a paging message of the user equipment sent by an MME; or receive, by using a Gb interface, a paging message of the user equipment sent by an SGSN.

Further, the processor 1002 is specifically configured to:

calculate the paging super frame according to a paging cycle of a network configuration, a paging super frame density, and an equipment identity of the user equipment; for example, determine, according to a formula: SFN mod T=(T div N)*(UE_ID mod N), the paging super frame in which the paging location is located; and calculate the paging occasion according to a quantity of paging occasions within one paging super frame, the equipment identity of the user equipment, and the paging super frame density; for example, determine, according to a formula: PO=floor(UE_ID/N) mod Ns, the paging occasion on which the paging location is located.

Symbols in the foregoing formulas: "mod" indicates dividing two integers to take a remainder; "div" indicates dividing two integers; "*" indicates multiplying two integers; "floor" indicates rounding down; and "/" indicates dividing two numbers.

Parameters in the foregoing formulas: UE_ID indicates the equipment identity of the user equipment that is used to identify the user equipment, and may be any one of the following identities: an international mobile user identity (English: International Mobile Subscriber Identification Number, IMSI for short), a temporary mobile user identity (English: Temporary Mobile User identity, TMSI for short), a globally unique temporary UE identity Globally Unique Temporary UE Identity, and an international mobile equipment identity (English: International Mobile Equipment Identity, IMEI for short).

T indicates the paging cycle.

Ns indicates a quantity of paging occasions (PO) in one downlink control information interval (DCI interval), and a value is: Ns=ceil (the length of a super frame/the length of DCI interval), that is, the quantity of the paging occasions is equal to an integer value that is obtained by rounding up a quotient of a length of the paging super frame divided by the downlink control information interval. For example, in a current M2M communications system, the length of the super frame is 64 radio frames (radio frame). In this case, if the DCI interval is 64 radio frames, Ns is 1 at most; if the DCI interval is 32 radio frames, Ns is 2 at most; or if the DCI interval is one radio frame, Ns is 64 at most.

N indicates the paging super frame density in a paging cycle. For example, N=T/4 indicates that in one paging cycle T, every four super frames may have only one paging super frame; N=T/2 indicates that in one paging cycle T, every two super frames have only one paging super frame; and N=T indicates that in one paging cycle T, every super frame may be a paging super frame.

Further, the communications unit 1001 is specifically configured to:

combine paging messages with a paging location and a coverage level that are the same as those of the user equipment into a same paging record list;

make the paging record list included in an air interface paging message that is corresponding to the user equipment; and use, according to a preset correspondence between a coverage level and a modulation and coding scheme MCS, an MCS that is corresponding to the coverage level of the user equipment to perform modulation and coding on the air interface paging message, and send the modulated and coded air interface paging message to the user equipment.

The paging record list includes: a paging message and a correspondence between the paging message and the user equipment.

The correspondence between a coverage level and a modulation and coding scheme MCS is set in an M2M communication process according to a requirement, which is not limited in this embodiment of the present invention.

For example, if a paging super frame in a paging location of user equipment 1 is the first super frame, a paging occasion is the sixth radio frame, and a coverage level of the user equipment 1 is the level 1, if a paging super frame in a paging location of user equipment 2 is the first super frame, a paging occasion is the sixth radio frame, and a coverage level of the user equipment 2 is the level 1, and if a paging super frame in a paging location of user equipment 3 is the first super frame, a paging occasion is the sixth radio frame, and a coverage level of the user equipment 3 is the level 1, paging messages of the user equipment 1, the user equipment 2, and the user equipment 3 may be combined into a same paging record list, and the paging record list is transmitted by using an air interface.

Obviously, the base station may use a default modulation and coding scheme (for example, a modulation and coding scheme that is corresponding to the worst coverage level) to send the paging message; may use, according to a coverage level of the user equipment sent by the MME or the SGSN, a corresponding modulation and coding scheme to transmit the paging message; or may use, according to a coverage level of the user equipment stored in the inside of the base station, a corresponding modulation and coding scheme to transmit a paging message set. Therefore, it is implemented that a paging message is sent to user equipment according to a coverage level of the user equipment, so that user equipment at different coverage levels determines, to some extent, a paging message that is corresponding to the user equipment, and returns a response message indicating that the paging is successful to the MME and the SGSN. However, because the user equipment may be moved to some extent, and a communication environment in which the user equipment is located is changing, a coverage level of the user equipment determined by the base station this time cannot accurately represent a current coverage level of the user equipment; if a paging message is sent after being modulated and coded according to an MCS that is corresponding to the coverage level, the user equipment cannot obtain the paging message because the user equipment fails to parse paging scheduling information, which further brings about paging message re-sending.

Therefore, to reduce a quantity of times of re-sending a paging message of the user equipment, the processor 1002 is further configured to re-determine a coverage level of the user equipment if the communications unit 1001 receives retransmission indication information that is used to instruct to re-send a paging message of the user equipment.

The communications unit 1001 is further configured to send an air interface paging message to the user equipment according to the coverage level of the user equipment re-determined by the processor 1002.

Further, the processor 1002 is specifically configured to:

if the retransmission indication message received by the communications unit 1001 includes a current coverage level of the user equipment, determine that the coverage level of the user equipment is the current coverage level; or if the retransmission indication message received by the communications unit 1001 does not include a current coverage level of the user equipment, lower the coverage level of the user equipment to a next inferior coverage level, or determine that the coverage level of the user equipment is the worst coverage level.

It may be learned from the foregoing that this embodiment of the present invention provides a base station. When receiving a paging message of user equipment, the base station calculates a paging location of the user equipment and determines a coverage level of the user equipment; and the base station sends an air interface paging message to the user equipment according to the coverage level of the user equipment, and sends, in the paging location, paging scheduling information, where the paging scheduling information is used to indicate a location in which the air interface paging message is sent, and the air interface paging message includes the paging message of the user equipment. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

Embodiment 8

Figure 11:
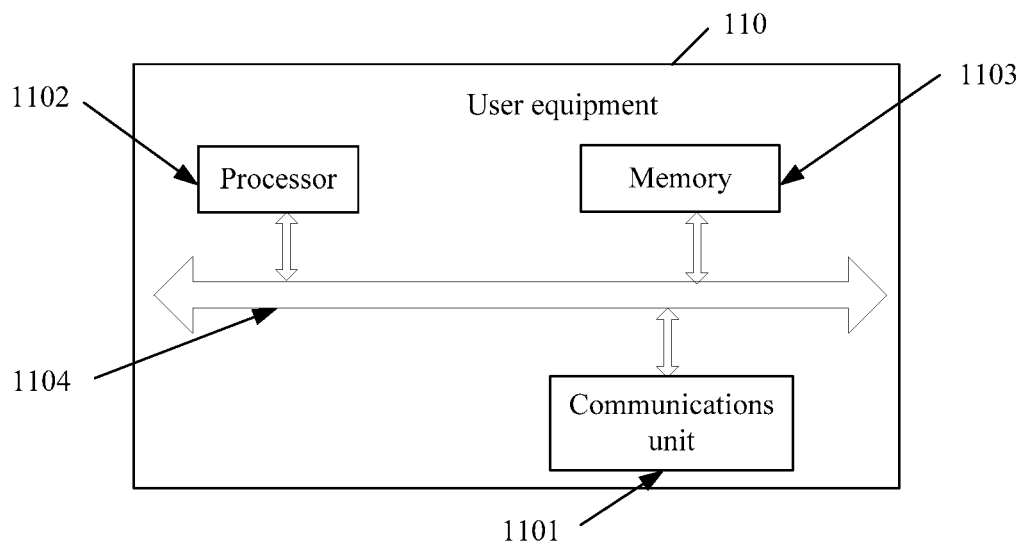
FIG. 11 is a structural diagram of user equipment according to another embodiment of the present invention.

FIG. 11 shows a structural diagram of user equipment, where the user equipment is configured to execute the paging method described in Embodiment 2. As shown in FIG. 11, the user equipment 110 may include: a communications unit 1101, a processor 1102, a memory 1103, and at least one communications bus 1104, where the communications bus 1104 is configured to implement connection and mutual communication between these devices.

The communications unit 1101 is configured to perform data transmission with an external network element.

The processor 1102 may be a central processing unit (CPU).

The memory 1103 may be a volatile memory, for example, a random access memory (RAM); may be a non-volatile memory, such as a read-only memory (ROM), a flash memory, a hard disk drive (HDD), or a solid-state drive (SSD); or may be a combination of the foregoing types of memories, and provides an instruction and data to the processor 1102.

The communications unit 1101 is configured to receive, in a paging location, paging scheduling information sent by a base station.

The paging scheduling message is coded according to a modulation and coding scheme MCS that is corresponding to a coverage level of the user equipment, and is used to indicate a location of an air interface paging message sent by the base station to the user equipment, where the coverage level of the user equipment is reported to an MME or an SGSN by the user equipment, and delivered to the base station by the MME or the SGSN.

The air interface paging message includes a paging message record list, where the paging message record list includes a paging message of at least one user equipment and a correspondence between the paging message of the user equipment and the user equipment. In the paging message list, a paging location of a paging message and a coverage level that are of each user equipment are the same as the paging location and the coverage level that are of the user equipment.

It should be noted that a method for calculating a paging location by the user equipment is the same as a method for calculating a paging location by the base station, and details are not described herein.

The processor 1102 is configured to decode, according to an MCS that is corresponding to a current coverage level of the user equipment, the paging scheduling information received by the communications unit 1101.

Further, the processor 1102 is configured to: if the processor 1102 successfully parses the paging scheduling information, which indicates that a coverage level used when the base station sends the paging scheduling information is the same as or lower than the current coverage level of the user equipment, receive, according to the location indicated by the paging scheduling information, the air interface paging message sent by the base station, and determine a paging message of the user equipment in the air interface paging message.

Further, the communications unit 1101 is configured to: if the user equipment fails to parse the paging scheduling information, which indicates that a coverage level used when the base station sends the paging scheduling information is higher than the current coverage level of the user equipment, report the current coverage level of the user equipment to the MME or the SGSN.

Further, the communications unit 1101 is specifically configured to:

report a random access message that carries the current coverage level of the user equipment to the base station, and instruct the base station to report the current coverage level of the user equipment to the MME or the SGSN; or report a registration Attach message, or a tracking area update TAU message, or a routing area update RAU message that carries the current coverage of the user equipment to the base station, and instruct the base station to forward the Attach message, or the TAU message, or the RAU message to the MME or the SGSN.

It may be learned from the foregoing that this embodiment of the present invention provides user equipment. After the user equipment receives paging scheduling information sent by a base station, if the user equipment successfully parses the paging scheduling information, the user equipment receives, according to a location indicated by the paging scheduling information, an air interface paging message sent by the base station, and obtains a paging message of the user equipment from the air interface paging message; or if the user equipment fails to parse the paging scheduling information, the user equipment reports a current coverage level of the user equipment to the base station, so that when re-sending a paging message to the user equipment, the base station re-sends the message to the user equipment according to the current coverage level of the user equipment. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

Embodiment 9

Figure 12:
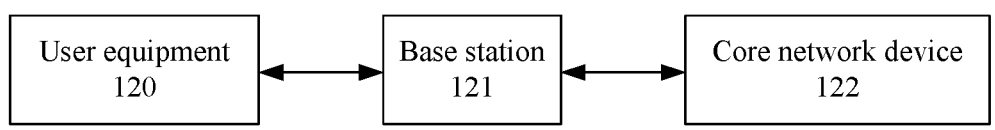
FIG. 12 is a structural diagram of a paging system according to another embodiment of the present invention.

FIG. 12 shows a structural diagram of a paging system, where the paging system is used to execute the paging method described in Embodiment 3. As shown in FIG. 12, the paging system may include:

a base station 121, at least one user equipment 120, and a core network device 122.

A function of the base station 121 is the same as a function of the base station 100 in the foregoing Embodiment 7, and a function of the user equipment 120 is the same as a function of the user equipment 110 in the foregoing Embodiment 8. Details are not described herein.

The core network device 122 may be an MME or an SGSN, and is configured to send a paging message of an M2M121 to the base station 121, or send retransmission indication information that is used to instruct to re-send a paging message of the user equipment.

It may be learned from the foregoing that this embodiment of the present invention provides a paging system. After receiving a paging message of user equipment sent by a core network device, a base station calculates a paging location of the user equipment, sends an air interface paging message to the user equipment according to a determined coverage level of the user equipment, and sends, in the paging location, paging scheduling information; after receiving the paging scheduling information sent by the base station, the user equipment parses the paging scheduling message and obtains the paging message; if the parsing succeeds, the user equipment returns a response message; or if the parsing fails, the user equipment reports a current coverage level of the user equipment, so that the base station re-sends a paging message to the user equipment according to the current coverage level, or the user equipment does not report a current coverage level, so that the base station re-sends a paging message to the user equipment according to a re-determined coverage level. Therefore, it is implemented that in an M2M communications system, a base station sends a paging message to user equipment according to a coverage level of the user equipment, so that user equipment in different coverage areas can properly receive a paging message to some extent, and a quantity of times of re-sending a paging message is reduced, thereby avoiding an existing problem that the user equipment fails to receive the paging message when a coverage intensity of a location in which the user equipment is located is extremely weak, where the problem is caused due to a fact that the base station sends the paging message to the user equipment without considering the coverage intensity of the location in which the user equipment is located.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication system, comprising a base station and a user equipment, wherein:
    the base station is configured to receive a paging message of the user equipment;
    the base station is further configured to determine a coverage level of the user equipment;
    the base station is further configured to send an air interface paging message to the user equipment according to the coverage level of the user equipment, wherein the air interface paging message comprises the paging message, and the coverage level indicates a network coverage intensity of a location in which the user equipment is located;
    the base station is further configured to receive indication information that is used to instruct to re-send the paging message; and
    the base station is further configured to re-determine the coverage level of the user equipment; and to re-send the paging message to the user equipment according to the re-determined coverage level.

2. The communication system according to claim 1, wherein:
    the paging message is from a core work device, wherein the core network device is a mobility management entity (MME) or a serving general packet radio service support node (SGSN).

3. The communication system according to claim 1, wherein the base station is further configured to determine a paging location of the user equipment according to the user identity of the user equipment comprises:
    determining, by the base station, according to a paging cycle of a network configuration, a paging super frame density, and an equipment identity of the user equipment, a paging super frame in which the paging location is located; and
    determining, by the base station, according to a quantity of paging occasions within one paging super frame, the equipment identity of the user equipment, and the paging super frame density, a paging occasion on which the paging location is located.

4. The communication system according to claim 1, wherein the paging message of the user equipment comprises a user identity of the user equipment; and
    the base station is further configured to determine a paging location of the user equipment according to the user identity;
    the base station is further configured to send, in the paging location, paging scheduling information, wherein the paging scheduling information indicates a location in which the air interface paging message is sent.

5. The communication system according to claim 1, wherein:
    the indication information is from a core work device, wherein the core network device is a MME or a SGSN.

6. A communication system, comprising a base station and a core network device, wherein:
    the core network device is configured to send a paging message of a user equipment to the base station;
    the base station is configured to receive the paging message;
    the base station is further configured to determine a coverage level of the user equipment;
    the base station is further configured to send an air interface paging message to the user equipment according to the coverage level of the user equipment, wherein the air interface paging message comprises the paging message, and the coverage level indicates a network coverage intensity of a location in which the user equipment is located;
    the core network device is further configured to send indication information to the base station, wherein the indication information is used to instruct the base station to re-send the paging message;
    the base station is further configured to re-determine the coverage level of the user equipment; and re-send the paging message to the user equipment according to the re-determined coverage level.

7. The communication system according to claim 6, wherein:
    the core network device is a mobility management entity (MME) or a serving general packet radio service support node (SGSN).

8. The communication system according to claim 6, wherein:
    the paging message comprises a user identity of the user equipment.

9. The communication system according to claim 6, further comprises:
    the base station is further configured to determine a paging location of the user equipment according to the user identity of the user equipment; and
    the base station is further configured to send, in the paging location, paging scheduling information, wherein the paging scheduling information is used to indicate a location in which the air interface paging message is sent.

10. A communication method, wherein the method comprises:
    sending, by a core network device, a paging message of a user equipment to the base station;
    receiving, by a base station, the paging message;
    determining, by a base station, a coverage level of the user equipment;
    sending, by the base station, an air interface paging message to the user equipment according to the coverage level of the user equipment, wherein the air interface paging message comprises the paging message, and the coverage level indicates a network coverage intensity of a location in which the user equipment is located;
    sending, by the core network device, indication information to the base station, wherein the indication information is used to instruct the base station to re-send the paging message;
    re-determining, by the base station, the coverage level of the user equipment; and re-sending, by the base station, the paging message to the user equipment according to the re-determined coverage level.

11. The communication method according to claim 10, wherein:
   the core network device is a mobility management entity (MME) or a serving general packet radio service support node (SGSN).

12. The communication method according to claim 10, wherein:
   the paging message comprises a user identity of the user equipment.

13. The communication method according to claim 10, further comprises:
   determining, by the base station, a paging location of the user equipment according to the user identity of the user equipment; and
   sending, by the base station, in the paging location, paging scheduling information, wherein the paging scheduling information is used to indicate a location in which the air interface paging message is sent.

* * * * *